United States Patent [19]
Fields et al.

[11] Patent Number: 6,121,907
[45] Date of Patent: Sep. 19, 2000

[54] UPWARD-FOLDING SUCCESSIVE-APPROXIMATION OPTICAL ANALOG-TO-DIGITAL CONVERTER AND METHOD FOR PERFORMING CONVERSION

[75] Inventors: Richard A. Fields, Redondo Beach; David L. Rollins, Hawthorne; Stephen R. Perkins; Eric L. Upton, both of Redondo Beach; Elizabeth T. Kunkee, Manhattan Beach; Lawrence J. Lembo; Juan C. Carillo, Jr., both of Torrance; Mark Kintis, Manhattan Beach, all of Calif.

[73] Assignee: TRW Inc., Redondo Beach, Calif.

[21] Appl. No.: 09/133,038

[22] Filed: Aug. 11, 1998

[51] Int. Cl.$^7$ ....................................................... H03M 1/00
[52] U.S. Cl. ............................................. 341/137; 341/155
[58] Field of Search .................................... 341/137, 155; 359/109

[56] References Cited

U.S. PATENT DOCUMENTS

| | | | |
|---|---|---|---|
| 4,441,096 | 4/1984 | Evanchuk | 341/137 |
| 4,712,089 | 12/1987 | Verber | 341/137 |
| 4,864,522 | 9/1989 | Heimgartner et al. | 341/137 |
| 4,947,170 | 8/1990 | Falk | 341/137 |
| 5,315,422 | 5/1994 | Utaka et al. | 359/107 |
| 5,675,428 | 10/1997 | Henmi | 359/161 |

FOREIGN PATENT DOCUMENTS

0744648A1  5/1995  European Pat. Off. .

*Primary Examiner*—Michael Tokar
*Assistant Examiner*—Peguy JeanPierre
*Attorney, Agent, or Firm*—Michael S. Yatsko

[57] ABSTRACT

An optical analog-to-digital converter (10) which fully operates in the optical domain and utilizes an upward-folding successive approximation approach for conversion. The converter (10) includes a plurality of optical stages (14, 16, 18) where each stage (14, 16, 18) generates a digital bit. Each stage (14, 16, 18) includes an optical threshold switch (30, 56, 78) that sets the bit high when the switch (30, 56, 78) is closed. When a sample amplitude of the analog signal is compared to a threshold value and found to exceed the threshold value, the bit is set to "high" and the sample is passed directly onto the next stage (14, 16, 18). If the sample amplitude is found to be less than the threshold value, the bit is set to "low" and an intensity equal to the maximum signal intensity minus the threshold intensity is added to the sample amplitude. Each successive stage (14, 16, 18) compares the normalized signal sample to thresholds growing closer and closer to the maximum signal intensity. Multiple bits can be obtained by cascading stages.

37 Claims, 2 Drawing Sheets

UPWARD-FOLDING SUCCESSIVE-APPROXIMATION OPTICAL ANALOG-TO-DIGITAL CONVERTER AND METHOD FOR PERFORMING CONVERSION

BACKGROUND OF THE INVENTION

1. Field of the Invention

This invention relates generally to an optical analog-to-digital converter and, more particularly, to an optical analog-to-digital converter that uses an upwardfolding, successive approximation conversion approach.

2. Discussion of the Related Art

Rapid advances in technology, particularly the need for greater processing speeds, increased channel bandwidths and improved transmission reliability, have resulted in a steadily growing focus on the optical domain and the vast potential therein. Optical technology, a relatively new field compared to electrical, radio frequency (RF)-based technology, lacks maturity in various areas. In particular, the promise of high-speed, large-bandwidth processing advances with digital optics has been hampered by the lack of many basic technologies readily available in the RF domain.

The optical analog-to-digital converter is one such area which has presented problems. In particular, conventional optical systems rely on digitization in the electrical/RF domain, resulting in slower, lossier and noisier conversions back and forth between the optical and RF domains. Moreover, conventional successive approximation analog-to-digital converters utilize a "downward-folding" approach to test the sampled analog signal against a specific threshold. If the sample is below the threshold, the bit is set to "low" and the sample is passed directly to the next stage. If the signal amplitude is above the threshold, the bit is set to "high" and the system reduces the sample amplitude by the threshold value before passing it on to the next stage. Each successive stage tests the sample against thresholds growing closer and closer to zero. The algorithm for such a converter is difficult to implement in the optical regime because simple, robust methods of subtracting optical signals from one another have not been adequately developed.

What is needed is an optical device which will convert an optical analog signal to an optical digital signal with little or no reliance on RF technology or subtraction techniques, will eliminate system complexity and will allow for high speed, large bandwidth processing advances.

SUMMARY OF THE INVENTION

The preceding and other shortcomings of the prior art are addressed and overcome by the present invention which provides, in one aspect, an apparatus for converting an analog optical signal to a digital optical signal corresponding to the intensity of the analog signal, including directing the analog signal to a series of optical stages. Each stage includes a laser for generating a "high" binary signal when the intensity of the analog signal is greater than a threshold value, and a "low" binary signal when the intensity of the analog signal is less than the threshold value. If the binary signal is set low, a specific amount of light from a second laser source is coupled in (or added to) the light of the original analog signal, thereby increasing the analog signal intensity by a fixed amount for the next stage in the series of stages.

In another aspect, the present invention provides a method for converting an analog optical signal into a digital optical signal corresponding to the intensity of the analog signal by generating the first bit (most significant) of the analog optical signal representative of whether the intensity of said analog optical signal is greater than or less than a predetermined threshold value. The intensity of the analog optical signal is increased whenever the intensity of the analog optical signal is less than the predetermined threshold value, and the signal is then passed on to the next stage of the process. To obtain the complete digital signal, the steps used for generating the first bit are repeated for a preselected number of iterations, changing only binarily weighted threshold values, and finally a digital signal representative of the intensity of the analog optical signal is generated.

In still another aspect, the present invention provides a converter for transforming an analog optical signal into a digital optical signal corresponding to the intensity of the analog signal. The analog signal is directed to a plurality of stages, where each stage includes an optical switch that receives a copy of the analog signal. The optical switch is transparent to a beam of light when the intensity of the analog signal is greater than a threshold value, and opaque to the beam of light when the intensity of the analog signal is less than the threshold value. A first laser source sends the beam of light to the optical switch. The beam of light is utilized to determine a first binary signal when the optical switch is transparent and second binary signal when the optical switch is opaque to the beam of light. Depending on the signal represented by this beam, the original analog signal will either be passed to the next stage unchanged or will be combined with light from another source, thereby increasing this intensity a fixed amount, before being passed to the next stage in the plurality of stages.

The foregoing and additional features and advantages of this invention will become apparent from the detailed description and accompanying drawing figures below.

DETAILED DESCRIPTION OF THE PREFERRED EMBODIMENTS

The following discussion of the preferred embodiments directed to an optical analog-to-digital converter is merely exemplary in nature, and is in no way intended to limit the invention or its applications or uses.

Figure 1:
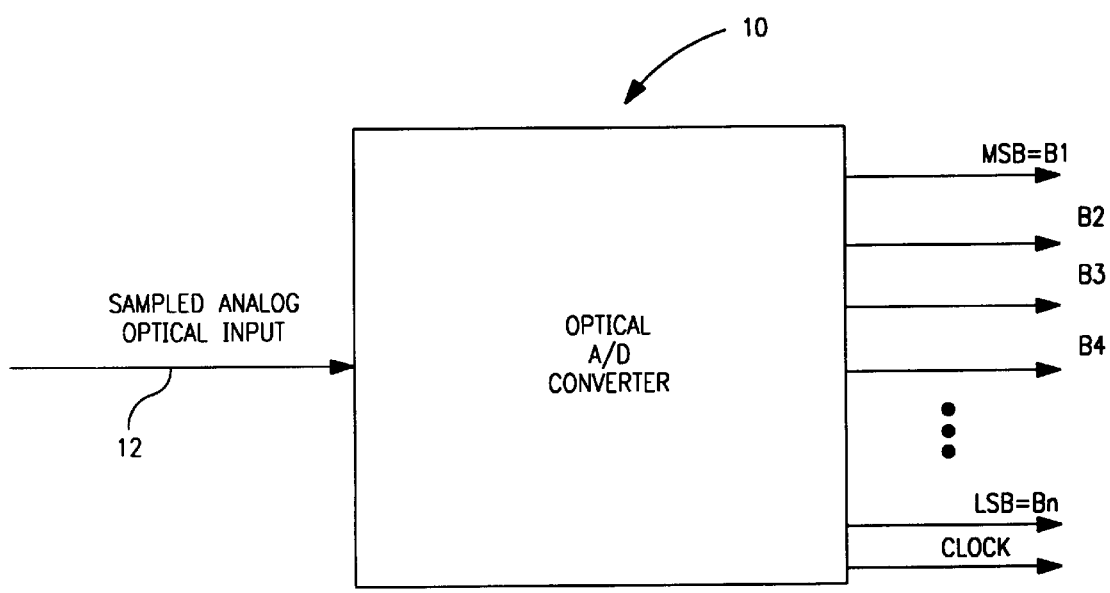
FIG. 1 is a general block diagram of an optical analog-to-digital converter utilizing an upward-folding successive approximation conversion approach in accordance with an embodiment of the invention.

Referring to FIG. 1, an optical analog-to-digital (A/D) converter 10 utilizing an upward-folding successive approximation conversion approach according to the invention is illustrated. The optical A/D converter 10 receives a sampled analog optical input signal 12 and outputs a corresponding digital signal consisting of a series of $B_1$–$B_n$ bits, where $B_1$ is the most significant bit (MSB) and $B_n$ is the least significant bit (LSB). The optical input signal 12 is sampled from any suitable sampler (not shown), known in the art, such as a pulsed laser driving a Mach-Zehnder modulator. The input signal 12 is typically a pulsed signal, but can be a continuous wave (CW) optical signal in certain applications. The optical signal 12 can have any suitable optical frequency for the purposes described herein and has a wavelength generally depicted as $\lambda_c$. The intensity of the optical signal 12 varies over time and can fall anywhere in the range of zero to some predetermined maximum intensity $I_{max}$. The digital output is sent to a subsequent processing system (not shown) that either converts the optical digital output to an electronic signal or processes the digital optical signal in the optical domain depending on the application. The optical A/D converter 10 of the present invention operates fully in the optical domain. By utilizing an upward-folding successive approximation technique, the present invention avoids the problems associated with optical power subtraction. The need for subtraction operations inherent in a conventional folding approach is therefore eliminated.

As will be described in detail below, the sampled analog signal 12 is sent to a first stage where it is compared to a threshold value. If the analog signal 12 exceeds the threshold value, a bit is set "high" and the sampled signal is passed directly onto a subsequent stage. If the sampled signal 12 is found to be less than the threshold value, the bit is set "low" and the intensity corresponding to $I_{max}$ minus the threshold value is added to the sampled signal 12. Multiple bits are obtained by cascading additional stages. Each successive stage compares the modified analog signal sample to thresholds growing closer and closer to a maximum value $I_{max}$. The optical A/D converter 10 is particularly useful in high speed digital optical links. By digitizing in the optical realm, higher bit rates can be achieved, lower noise levels can be realized and system complexity can be reduced.

Figure 2:
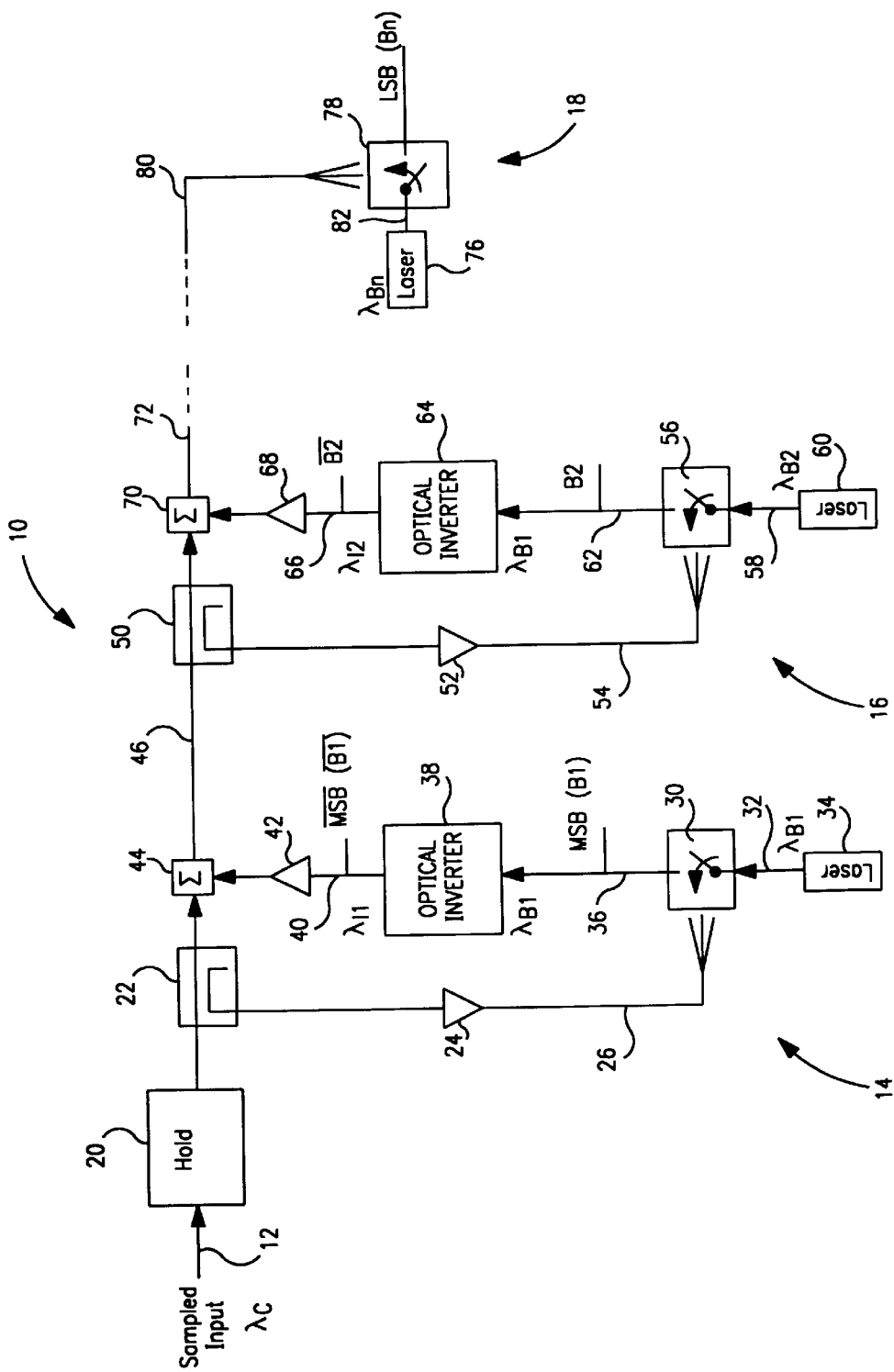
FIG. 2 is a schematic block diagram of the optical analog-to-digital converter shown in FIG. 1.

FIG. 2 shows a schematic block diagram of the AND converter 10. The optical A/D converter 10 includes a series of successive conversion stages, where each stage generates one of the bits $B_1$–$B_n$, starting with the MSB and proceeding to the LSB. A first stage 14 generates the bit $B_1$, a second stage 16 generates the bit $B_2$ and a last stage 18 generates the bit $B_n$. Other stages would typically be provided between the second stage 16 and the last stage 18, and the number of stages would depend on the desired resolution. The sampled input signal 12 is first applied to an optional hold device 20 that stretches the pulses in the input signal 12 for synchronization of the input signal 12 to other optical signals in the stages 14, 16, and 18 as will be described in more detail below.

The first stage 14 includes an optical coupler 22 that receives the sampled input signal 12 from the hold device 20. A portion of the input signal 12 is tapped off of the signal 12 by the coupler 22 and is applied to an optical amplifier 24. The optical coupler 22 can be any suitable optical coupler for the purposes described herein, and may be a pair of cooperating fiber-optic cables in one embodiment. The coupler 22 only taps off a small portion of the light intensity from the input signal 12, and in one embodiment the tapped portion is about 5% of the total intensity. The optical amplifier 24 amplifies the tapped portion of the signal 12 as a control beam 26 by a predetermined and fixed amount. In one embodiment, the gain of the amplifier 24 is set so that the control beam 26 has the same intensity as the input signal 12 applied to the coupler 22. Therefore, the control beam 26 would also have an intensity value between 0 and $I_{max}$.

The control beam 26 is applied to an optical thresholding switch 30. Additionally, a low intensity laser beam 32 generated by a laser 34 is also applied to the thresholding switch 30. The laser beam 32 has a wavelength of $\lambda_{B1}$, and can be a pulsed beam or a CW beam. If the control beam 26 has an intensity greater than 0.5 $I_{max}$, that is halfway between no beam intensity and a maximum beam intensity of the sampled input signal 12, the thresholding switch 30 switches on to allow the laser beam 32 to pass through the switch 30 as a bit beam 36 having a "high" value. Likewise, if the intensity of the control beam 26 is at or below 0.5 $I_{max}$, the thresholding switch 30 prevents the laser beam 32 from passing through the switch 30 and the bit beam 36 has a "low" value. The bit beam 36 is the output bit for the first stage 14. Therefore, if the laser beam 32 passes through the optical switch 30, the bit $B_1$ is set, and if the bit beam 36 from the switch 30 is low, the output bit $B_1$ is not set.

In one embodiment, the optical thresholding switch 30 is a saturable absorber, well known to those skilled in the art. The saturable absorber switch 30 is opaque unless the light intensity impinging upon it is greater than some value that is designed into the switch 30. Therefore, by knowing the projected intensity of the control beam 26 and the intensity of the laser beam 32, the switch 30 can be designed accordingly. When the intensity of the control beam 26 is above 0.5 $I_{max}$, then the absorber thresholding switch 30 turns from opaque to transparent, and the laser beam 32 passes through. Of course, the thresholding switch 30 can be any optical thresholding switch known to those skilled in the art, suitable for the purposes described herein, such as an electro-absorption modulator (EAM). As would be known to those skilled in the art, if the thresholding switch 30 is an EAM, the control beam 26 would need to be switched to an electrical signal by a suitable photodetector or the like.

The bit beam 36 from the thresholding switch 30 is sent to an optical inverter 38. The optical inverter 38 inverts the bit beam 36 so that if the bit beam 36 is on or high, an output bit beam 40 of the inverter 38, having a wavelength hq, is an optical low or off. Likewise, if the bit beam 36 is off or low, then the output beam 40 of the inverter 38 is on or high. The optical inverter 38 can be any suitable optical inverter, known in the art, such as a semiconductor optical amplifier (SOA) inverter, or the optical inverter disclosed in U.S. patent application Ser. No. 09/133,032, filed Aug. 11, 1998, titled "A Saturable Absorber Based Optical Logic Inverter," and assigned to the assignee of this application. If the laser beam 32 is a pulsed beam, then the optical inverter 38 is a pulse inverting device.

The inverted bit beam 40 is applied to an optical amplifier 42 that amplifies the inverted bit beam 40 to 0.5 $I_{max}$ if the inverted bit beam 40 is high, or 0.0 if the inverted bit beam 40 is low. The amplified inverted bit beam is applied to an optical summer 44. Additionally, the sampled input signal from the coupler 22 is also applied to the summer 44. The intensity of the sampled input 12 applied to the summer 44 will be less the small percentage tapped by the coupler 22, but these optical losses in the coupler 22 are calibrated out by adjusting the amplifier gains (24, 42, 54, 68) or the switch thresholds (30, 56, 78) in subsequent stages. Therefore the summer 44 can, for simplicity, be said to have an intensity value between 0.5 $I_{max}$ and $I_{max}$. The output beam 46 is the analog input beam to the second stage 16. The hold device 20 is important so that the pulses of the inverted bit beam can be synchronized to the pulses in the sampled input 12. The hold device 20 can be placed after the optical inverter 38 or the amplifier 42, and perform the same function. The operation of the first stage 14 described above can be summarized as follows. If the intensity of the sampled input 12 is 0.5 $I_{max}$ or less, the thresholding switch 30 remains opaque and does not pass the laser beam 32, and thus the bit $B_1$ is low. If the intensity of the sampled input 12 is greater than 0.5 $I_{max}$, the optical switch 30 closes, thus passing the laser beam 32 and setting the bit $B_1$ high. Therefore, the most significant bit will be switched high if the intensity of the sampled input 12 is greater than 0.5 $I_{max}$. In order to further resolve the amplitude of the sampled input 12, subsequent bits are set high or low based on a continued narrowing of the original sample range 0.0 to 0.5 $I_{max}$. To generate the narrowed sample input, the amplifier 40 adds an intensity value of 0.0 or 0.5 $I_{max}$ to the sampled input 12 depending on whether the bit $B_1$ is high or low, by the optical inverter 38. Therefore, the output of the summer 44 will always be between 0.5 $I_{max}$ and $I_{max}$. Subsequent stages will keep narrowing the previous range by half, a process known as "upward folding."

The second stage input beam 46 is applied to an optical coupler 50 in the second stage 16. The operation of the second stage 16 is the same as the first stage 14. A small portion of the input beam 46 is tapped off by the coupler 50 and is applied to an optical amplifier 52. In one embodiment, the optical amplifier 52 amplifies the tapped portion of the beam 46 so that it has substantially the same intensity as the beam 46 to generate a second stage control beam 54. Therefore, the intensity of the second stage control beam 54 is between 0.5 $I_{max}$ and $I_{max}$. The control beam 54 is applied to a second stage optical thresholding switch 56, and a low intensity laser beam 58 from a laser 60 is applied to the switch 56. The switch 56 closes and passes the laser beam 58 if the intensity of the control beam 54 is greater than 0.75 $I_{max}$. When the optical switch 56 closes, the laser beam 58 propagates through and exits the switch 56 as a bit beam 62 representing the second bit $B_2$. Therefore, the bit $B_2$ is set high or low depending on the intensity of the input beam 46. The second stage 16 also includes an optical inverter 64 that inverts the bit beam 62, and sends an inverted bit beam 66 to an optical amplifier 68. If the inverted bit beam 66 is low, the optical amplifier 68 outputs a no intensity beam, and if the inverted bit beam 66 is high, the optical amplifier 68 outputs a beam having an intensity of 0.25 $I_{max}$. The amplified inverted bit beam from the amplifier 68 is applied to a second stage summer 70 that also receives the input beam 46. Based on the discussion above, an output beam 72 from the summer 70 will have an intensity representation between 0.75 $I_{max}$ and $I_{max}$.

As is apparent, the operation of the second stage 16 is the same as the operation of the first stage 14, except that the threshold and calibration values of the various components are changed according to the successive approximation scheme. Further successive stages can be provided that are the same as the first stage 14 and the second stage 16, depending on the number of bits of resolution desired. The first stage 14 determined whether the intensity of the sampled input 12 was between 0.0 and 0.5 $I_{max}$ or 0.5 $I_{max}$ and $I_{max}$. The second stage 16 determined whether the intensity of the "upward-folded" input 46 was between 0.5 $I_{max}$ and 0.75 $I_{max}$ or 0.75 $I_{max}$ and $I_{max}$. Successive stages would keep dividing the sampled range in half in this manner as many times as desired. For example, a third stage following the second stage 16 would determine whether the intensity of the sampled input 12 was between 0.75 $I_{max}$ and 0.875 $I_{max}$ or between 0.875 $I_{max}$ and $I_{max}$.

The last stage 18 determines the least significant bit $B_n$. The stage 18 includes a low power laser 76 and an optical thresholding switch 78. An input beam 80 to the stage 18 is the control beam controlling the switch 78. In this example, the output beam 72 from the summer 70 is the input beam 80 controlling the switch 78. Assuming that the last stage 18 is the stage after the second stage 16, if the intensity of the beam 72 is between 0.875 $I_{max}$ and $I_{max}$, the switch 78 will close, and a laser beam 82 generated by the laser 76 will pass through the switch 78 and the bit $B_n$ will be high. Otherwise, that is, if the intensity of the beam 72 is between 0.75 $I_{max}$ and 0.875 $I_{max}$, the bit $B_n$ will be low. If there are subsequent stages between the stage 16 and the stage 18, the switch 78 will close if the control beam has an intensity greater than $1-2^{-n} I_{max}$.

The selection of wavelengths used in the converter 10 is important to minimize interference effects. In particular, if the signals carried on different optical fibers are to be added together, in a power sense, the wavelengths of two or more signals being added must differ to avoid constructive and destructive interference effects. The bit wavelengths for the different stages ($\lambda_{B1}, \lambda_{B2}, \ldots, \lambda_{Bn}$) can be equal to one another and to the sample wavelength, $\lambda_c$, because they are all filtered out and not added back into the adjusted analog input signal. Each of the inverted bit wavelengths $\lambda_{I1}, \lambda_{I2}, \ldots, \lambda_{In-1}$), however, must be different from each other and the sample wavelength $\lambda_c$. Therefore, an n-bit analog-to-digital converter 10 would require at least n different wavelengths.

The optical analog-to-digital converter 10 of the present invention is not limited to a particular number of stages, but rather may be utilized to provide a digital signal having any number of bits. Moreover, the threshold level of the thresholding switches and the amplifier gain levels are not limited to the values provided herein. For example, the amplifiers 24 and 52 that generate the control beams 26 and 54 may have their gains set so that the control beams 26 and 54 are not exact copies of the original signals 12 and 46, so long as the threshold levels in the optical switches 30 and 56 are adjusted to compensate for this.

It will be appreciated by persons skilled in the art that the present invention is not limited to what has been shown and described hereinabove, but the scope of invention is limited solely by the claims which follow.

What is claimed is:

1. An optical analog-to-digital converter for converting an optical analog signal to an optical digital signal having a plurality of bits, said converter comprising:

a first optical stage receiving a first stage optical analog input signal, said first stage input signal having an intensity representation within a first predetermined beam range from a minimum beam intensity to a maximum beam intensity, said first optical stage including a first optical coupler separating a first control beam from the first stage input signal, said first stage further including a first optical thresholding switch receiving the first control beam and a first laser beam from a laser source, said first thresholding switch emitting a first bit beam if the intensity of the first control beam is greater than a first stage intensity value, said first bit beam representing one of the bits of the digital signal, said first optical stage providing a first stage optical output signal; and a second optical stage receiving a second stage optical analog input signal, said second stage input signal being based on the first stage output signal, said second optical stage including a second optical coupler separating a second control beam from the second stage input signal, said second stage further including a second optical thresholding switch receiving the second control beam and a second laser beam from a laser source, said second thresholding switch emitting a second bit beam if the intensity of the second control beam is greater than a second stage intensity value, said second bit beam representing another one of the bits of the digital signal.

2. The converter according to claim 1 wherein the second stage input signal has an intensity representation within a second beam range from a mid-point of the first beam range and the maximum beam intensity, and wherein the second stage intensity value is greater than the first stage intensity value.

3. The converter according to claim 1 wherein the first stage further includes a first optical inverting device inverting the first bit beam and a first optical summer combining the first stage input signal and the first inverted bit beam, the combination of the first stage input signal and the first inverted bit beam being the second stage input signal, and wherein the second stage further includes a second optical inverting device inverting the second bit beam and a second optical summer combining the second stage input signal and the second inverted bit beam.

4. The converter according to claim 3 wherein the first stage further includes a first optical amplifier receiving the first inverted bit beam and the second stage further includes a second optical amplifier receiving the second inverted bit beam, said first optical amplifier amplifying the first inverted beam to a first predetermined intensity value if the first inverted bit beam is high and said second optical amplifier amplifying the second inverted bit beam to a second predetermined intensity value if the second inverted beam is high.

5. The converter according to claim 1 wherein the first stage further includes a first optical amplifier receiving the first control beam and the second stage further includes a second optical amplifier receiving the second control beam, said first optical amplifier amplifying the first control beam to a first predetermined intensity level and said second optical amplifier amplifying the second control beam to a second predetermined intensity level.

6. The converter according to claim 5 wherein the first optical amplifier amplifies the first control beam to an intensity that is substantially the same as the intensity of the first stage input signal and the second optical amplifier amplifies the second control beam to an intensity that is substantially the same as the intensity of the second stage input signal.

7. The converter according to claim 1 wherein the first and second optical switches are saturable absorbers, said first saturable absorber turning transparent if the first control beam is greater than a predetermined intensity and said second saturable absorber turning transparent if the second control beam is greater than a predetermined intensity.

8. The converter according to claim 7 wherein the second stage saturable absorber turns transparent at a higher intensity than the first stage saturable absorber.

9. The converter according to claim 1 wherein the first thresholding switch emits the first bit beam if the first control beam has an intensity greater than an intensity halfway between the maximum beam intensity and the minimum beam intensity, otherwise the first thresholding switch does not emit the first bit beam, and wherein the second thresholding switch emits the second bit beam if the intensity of the second control beam is greater than an intensity halfway between the intensity halfway between the maximum beam intensity and the minimum beam intensity and the maximum beam intensity, otherwise the second thresholding switch does not emit the second bit beam.

10. The converter according to claim 1 further comprising a final optical stage receiving a final stage optical analog input signal, said final optical stage including a third optical thresholding switch receiving the final stage analog input signal and a laser beam, said third thresholding switch emitting a final bit beam if the intensity of the final stage input signal is greater than a final stage intensity value, said final bit beam representing another one of the bits of the digital signal.

11. The converter according to claim 10 wherein the final stage intensity value is larger than the second stage intensity value.

12. The converter according to claim 10 wherein the final optical stage is the nth stage of the converter, and wherein the third optical thresholding switch emits the final bit beam if the intensity of the final analog input signal is greater than $1-2^{-n}$ times the maximum beam intensity.

13. The converter according to claim 1 further comprising a hold device, said hold device holding the optical analog signal for a predetermined period of time in order to stretch pulses in the analog signal prior to the analog signal being applied to the first optical stage.

14. An optical system for converting an optical analog signal to an optical digital signal having a plurality of digital data bits, said system comprising a plurality of optical stages where each stage receives an analog input signal and outputs one of the digital data bits, a first optical stage receiving a sampled optical analog input signal representative of the optical analog signal and outputting a most significant bit, and a last optical stage receiving a last stage analog input signal and outputting a least significant bit, each of the plurality of optical stages including an optical thresholding switch receiving a control beam and a laser beam, said thresholding switch outputting a bit beam representing the data bit for that stage if the control beam is greater than a predetermined intensity, each of the plurality of the stages further including an optical coupler and an optical amplifier, said optical coupler tapping off a portion of the analog input signal and said optical amplifier amplifying the tapped portion of the analog input signal to a predetermined level to generate the control beam, wherein the plurality of optical stages combine to perform an upwardfolding, successive approximation conversion of the optical analog signal.

15. The system according to claim 14 wherein each optical thresholding switch is a saturable absorber, said saturable absorber switching from an opaque mode to a transparent mode if the control beam is greater than the predetermined intensity, said saturable absorber passing the laser beam as the bit beam when the absorber is transparent.

16. The system according to claim 14 wherein the optical amplifier amplifies the control beam to substantially the same intensity as the analog signal applied to the coupler.

17. The system according to claim 14 wherein each of a plurality of the stages include an optical inverter, said optical inverter receiving the bit beam from the thresholding switch and outputting an inverted bit beam, said inverted bit beam being amplified by an optical amplifier to a predetermined beam intensity and being combined with the input signal, wherein the combination of the amplified inverted bit beam and the input signal is the analog input signal to a successive optical stage and wherein the analog input signal to each successive stage defines a narrower optical intensity range approaching a maximum optical intensity.

18. The system according to claim 14 wherein the first optical stage sets the most significant bit high if the optical input signal has an intensity greater than the intensity halfway between a maximum beam intensity and a minimum beam intensity, otherwise the first optical stage outputs a low bit, and wherein a second successive optical stage sets a second bit high if the intensity of the analog signal has an intensity greater than an intensity halfway between the intensity halfway between the maximum beam intensity and the minimum beam intensity and the maximum beam intensity, otherwise the second stage outputs a low bit.

19. The system according to claim 18 wherein the system has n number of optical stages, and wherein the last optical stage sets an output bit high if the intensity of the analog input signal to the last stage is greater than $1-2^{-n}$ times a maximum system analog input signal intensity.

20. An optical system for converting an optical analog signal to an optical digital signal, said system comprising:

an optical thresholding switch receiving an analog control signal and an optical beam, said thresholding switch setting an optical binary bit high if the intensity of the analog control signal is greater than a threshold value and setting the optical binary bit low if the intensity of the analog control signal is less than the threshold value; and an optical device receiving the optical binary bit from the thresholding switch, said optical device increasing the intensity of the analog signal if the binary bit from the thresholding switch is set low.

21. The system according to claim 20 wherein the optical device includes an optical inverter receiving the binary bit from the thresholding switch and an optical amplifier receiving an inverted binary bit from the optical inverter, said optical amplifier outputting an optical signal that is combined with the analog signal if the optical output of the inverter is set high.

22. The system according to claim 20 wherein the thresholding switch is a saturable absorber that turns transparent when the analog control signal is greater than the threshold value, said optical beam being a laser beam propagating through the absorber to be the high optical binary bit when the saturable absorber is transparent.

23. The system according to claim 20 further comprising an optical amplifier, said optical amplifier receiving a tapped portion of the optical analog signal and amplifying the tapped portion of the optical analog signal to a predetermined intensity level, said amplified tapped portion of the optical analog signal being the analog control signal.

24. The system according to claim 23 wherein the optical amplifier amplifies the tapped portion of the optical analog signal to be substantially the same intensity as the optical analog signal, said amplified tapped portion of the optical analog signal being the analog control signal.

25. A method of converting an optical analog signal to an optical digital signal having a plurality of digital data bits, said method comprising the steps of:

sending the optical analog optical signal to a first optical stage;

separating a portion of the optical analog signal from the optical analog signal and generating a first control beam from the separated portion of the optical signal;

applying the first control beam to a first optical thresholding switch;

applying a first laser beam to the first optical thresholding switch;

closing the optical switch if the first control beam has an intensity above a first threshold value so as to pass the first laser beam through the optical switch as a first bit beam, said first bit beam being an output bit of the first optical stage; and inverting the first bit beam.

26. The method according to claim 25 further comprising the steps of sending an optical analog signal to a second optical stage, separating a portion of the second stage optical analog signal from the second stage optical analog signal and generating a second control beam from the separated portion of the second stage optical signal, applying the second control beam to a second optical thresholding switch, applying a second laser beam to the second optical thresholding switch, and closing the second optical thresholding switch if the second control beam has an intensity above a second threshold value so as to pass the second laser beam through the second optical switch as a second bit beam, said second bit beam being an output bit of the second optical stage.

27. The method according to claim 26 wherein the intensity threshold value of the second stage optical thresholding switch is greater than the intensity threshold value of the first stage thresholding switch.

28. The method according to claim 25 further comprising the steps of applying the inverted first bit beam to an optical amplifier, and adding the amplified inverted optical bit beam to the optical analog signal to generate a second stage optical signal.

29. A method for converting an analog optical signal into a digital signal corresponding to an intensity of said analog optical signal, comprising the steps of:

generating a bit of said analog optical signal representative of whether the intensity of said analog optical signal is greater than or less than a predetermined threshold value;

increasing the intensity of said analog optical signal if the intensity of said analog optical signal is less than said predetermined threshold value;

repeating the steps of generating a bit and increasing the intensity of said analog optical signal for a preselected number of iterations; and generating a digital signal representative of the intensity of said analog optical signal from said bits.

30. The method according to claim 29 wherein the step of generating a bit includes setting the predetermined threshold value at 0.5 times a maximum analog signal intensity for a first iteration, and wherein the step of repeating the steps of generating a bit includes setting the predetermined threshold value to 0.75 times the maximum analog signal intensity for a next iteration, and progressively setting the predetermined threshold value to be a value halfway between the previous predetermined threshold value and the maximum analog signal intensity.

31. An optical analog-to-digital converter for converting an optical analog signal to an optical digital signal having a plurality of bits, said converter comprising:

a first optical stage receiving a first stage optical analog input signal, said first stage input signal having an intensity representation within a first predetermined beam range from a minimum beam intensity to a maximum beam intensity, said first optical stage including a first optical coupler separating a first control beam from the first stage input signal, said first stage further including a first optical thresholding switch receiving the first control beam and a first laser beam, said first thresholding switch emitting a first bit beam if the intensity of the first control beam is greater than a first stage intensity value, said first bit beam representing one of the bits of the digital signal, said first stage further including a first optical inverting device inverting the first bit beam and a first optical summer combining the first stage input signal and the first inverted bit beam; and a second optical stage receiving a second stage optical analog input signal, the combination of the first stage input signal and the first inverted bit beam being the second stage input signal, said second optical stage including a second optical coupler separating a second control beam from the second stage input signal, said second stage further including a second optical thresholding switch receiving the second control beam and a second laser beam, said second thresholding switch emitting a second bit beam if the intensity of the second control beam is greater than a second stage intensity value, said second bit beam representing another one of the bits of the digital signal, said second stage further including a second optical inverting device inverting the second bit beam and a second optical summer combining a second stage input signal and a second inverted bit beam.

32. The converter according to claim 31 wherein the first stage further includes a first optical amplifier receiving the first inverted bit beam and the second stage further includes a second optical amplifier receiving the second inverted bit beam, said first optical amplifier amplifying the first inverted beam to a first predetermined intensity value if the first inverted bit beam is high and said second optical amplifier amplifying the second inverted bit beam to a second predetermined intensity value if the second inverted beam is high.

33. An optical analog-to-digital converter for converting an optical analog signal to an optical digital signal having a plurality of bits, said converter comprising:

a first optical stage receiving a first stage optical analog input signal, said first stage input signal having an intensity representation within a first predetermined beam range from a minimum beam intensity to a maximum beam intensity, said first optical stage including a first optical coupler separating a first control beam from the first stage input signal, said first stage further including a first optical thresholding switch receiving the first control beam and a first laser beam, said first thresholding switch emitting a first bit beam if the intensity of the first control beam is greater than a first stage intensity value, said first bit beam representing one of the bits of the digital signal, said first stage further including a first optical amplifier receiving the first control beam, said first optical amplifier amplifying the first control beam to a predetermined intensity level, said first optical stage providing a first stage optical output signal; and a second optical stage receiving a second stage optical analog input signal, said second stage input signal being based on the first stage output signal, said second optical stage including a second optical coupler separating a second control beam from the second stage input signal, said second stage further including a second optical thresholding switch receiving the second control beam and a second laser beam, said second thresholding switch emitting a second bit beam if the intensity of the second control beam is greater than a second stage intensity value, said second bit beam representing another one of the bits of the digital signal, said second stage further including a second optical amplifier receiving the second control beam, said second optical amplifier amplifying the second control beam to a second predetermined intensity level.

34. The converter according to claim 33 wherein the first optical amplifier amplifies the first control beam to an intensity that is substantially the same as the intensity of the first stage input signal and the second optical amplifier amplifies the second control beam to an intensity that is substantially the same as the intensity of the second stage input signal.

35. An optical system for converting an optical analog signal to an optical digital signal having a plurality of digital data bits, said system comprising a plurality of optical stages where each stage receives an analog input signal and outputs one of the digital data bits, a first optical stage receiving a sampled optical analog input signal representative of the optical analog signal and outputting a most significant bit, and a last optical stage receiving a last stage analog input signal and outputting a least significant bit, wherein the first optical stage sets the most significant bit high if the optical input signal has an intensity greater than the intensity halfway between a maximum beam intensity and a minimum beam intensity, otherwise the first optical stage outputs a low bit, and wherein a second successive optical stage sets a second bit high if the intensity of the analog signal has an intensity greater than an intensity halfway between the intensity halfway between the maximum beam intensity and the minimum beam intensity and the maximum beam intensity, otherwise the second stage outputs a low bit.

36. The system according to claim 35 wherein the system has n number of optical stages, and wherein the last optical stage sets an output bit high if the intensity of the analog input signal to the last stage is greater than $1-2^{-n}$ times a maximum system analog input signal intensity.

37. An optical system for converting an optical analog signal to an optical digital signal having a plurality of digital data bits, said system comprising a plurality of optical stages where each stage receives an analog input signal and outputs one of the digital data bits, a first optical stage receiving a sampled optical analog input signal representative of the optical analog signal and outputting a most significant bit, and a last optical stage receiving a last stage analog input signal and outputting a least significant bit, each of the plurality of optical stages including an optical thresholding switch receiving a control beam and a laser beam, said thresholding switch outputting a bit beam representing the data bit for that stage if the control beam is greater than a predetermined intensity, each of the plurality of the stages further including an optical inverter, said optical inverter receiving the bit beam from the thresholding switch and outputting an inverted bit beam, said inverted bit beam being amplified by an optical amplifier to a predetermined beam intensity and being combined with the input signal, wherein the combination of the amplified inverted bit beam and the input signal is the analog input signal to a successive optical stage and wherein the analog input signal to each successive stage defines a narrower optical intensity range approaching a maximum optical intensity.

* * * * *